United States Patent [19]
Firth et al.

[11] Patent Number: 6,109,289
[45] Date of Patent: Aug. 29, 2000

[54] DRAIN VALVE

[75] Inventors: Brian Frank Firth, Skellow; Barry David Thomas, Drighlington, both of United Kingdom

[73] Assignee: Wabco Automotive UK Limited, Leeds, United Kingdom

[21] Appl. No.: 09/202,990

[22] PCT Filed: Jun. 24, 1997

[86] PCT No.: PCT/GB97/01715

§ 371 Date: Aug. 18, 1999

§ 102(e) Date: Aug. 18, 1999

[87] PCT Pub. No.: WO98/00324

PCT Pub. Date: Jan. 8, 1998

[30] Foreign Application Priority Data

Jun. 29, 1996 [GB] United Kingdom ................. 96137070

[51] Int. Cl.[7] .................................................. F16K 31/12

[52] U.S. Cl. .............................................. 137/203; 137/204
[58] Field of Search ...................................... 137/203, 204

[56] References Cited

FOREIGN PATENT DOCUMENTS

| 0 002 029 | 5/1979 | European Pat. Off. . |
|---|---|---|
| 33 08 683 | 9/1984 | Germany . |
| WO 96/02789 | 2/1996 | WIPO . |

*Primary Examiner*—Gerald A. Michalsky
*Attorney, Agent, or Firm*—Stroock & Stroock & Lavan LLP

[57] ABSTRACT

A drain valve of an air braking system for vehicles has a drainage piston, a main sump and auxiliary sump. Moisture passes from the main sump to the auxiliary sump in response to pressure at a signal port which closes off air supply through ports. A reduction in pressure at the signal port causes the ports to be reconnected and allows moisture to be expelled through the drainage outlet.

10 Claims, 5 Drawing Sheets

DRAIN VALVE

The present invention relates to a drain valve, and particularly to a drain valve for use in an air braking system.

Efficient working of an air braking system requires exclusion of moisture which may be drawn in by the compressor (usually engine driven) or produced as a result of condensation.

Moisture can cause seizure of parts, and otherwise interfere with correct operation. It is thus usual to provide an air dryer to ensure that air delivered to the system is of a consistent quality. The air dryer usually comprises a replaceable canister of desiccant which is itself periodically regenerated by a volume of dry air. Such an arrangement is conventional.

It is desirable to hold air under pressure between the compressor and the air dryer when the compressor is off load; this arrangement ensures that oil is less likely to escape past the compressor piston rings under the influence of pressure in the engine crankcase, and thus contaminate the desiccant when the compressor is brought on load.

A valve is provided between the compressor and desiccant canister to hold the compressor outlet under pressure when the compressor is off load. This valve is conveniently located in the body to which the desiccant canister is attached, and is responsive to governor pressure to open and close communication between the compressor and the desiccant canister.

Typically this valve is under the desiccant canister and may accumulate excess moisture which drains down under gravity. If such moisture is not periodically expelled the valve may malfunction. The moisture is not able to escape to atmosphere through a simple vent because the valve must remain pressure tight in order for the air braking system to maintain its integrity. The present invention provides one means of eliminating such moisture.

According to the invention there is provided a drain valve comprising a housing defining a chamber, a flow inlet and a flow outlet opening into the chamber, a flow path defined in the chamber and providing fluid communication between the flow inlet and the flow outlet, a closure member arranged to move in use within the housing between a first position wherein the flow path is occluded and a second position wherein the flow path is unobstructed, the drain valve further comprising a signal port, and movement of the closure member being effected in use by the presence or absence of a signal pressure at said signal port, and a sump adapted to collect liquid in the drain valve, wherein the sump comprises discharge means adapted to discharge liquid collected in the sump to the exterior of the valve, the discharge means being activated in use by a predetermined variation in pressure at the signal port.

The chamber may be of uniform cross-section. Accordingly, the closure member may comprise a piston sealingly slidable in the housing. The flow inlet and flow outlet may be arranged to open into the chamber at one end of the housing.

The flow inlet and flow outlet may comprise concentric openings in one end of the housing; the closure member may define a sealing surface arranged to seal over the openings.

The signal port is preferably positioned in a sidewall of the housing. The signal port may be positioned in the sidewall so as to enter into the chamber on the opposite side of the piston from the flow inlet and flow outlet.

Preferably, the opposite side of the piston from the flow inlet and flow outlet is castellated. An abutment surface may be provided adjacent the signal port and parallel with the side of the piston opposite from the flow inlet and outlet, the abutment surface being arranged to abut, in use, against said side of the piston. The abutment surface may be defined by the discharge means.

The castellation of the piston ensures that the signal port is not obstructed at the extreme piston position.

The discharge means may comprise a valve member mounted in the housing across a discharge passage in fluid communication between the sump and the exterior of the housing, and an auxiliary sump, the valve member being movable between a first sealing position wherein the sump and the auxiliary sump are obstructed from fluid communication therebetween and the auxiliary sump is in fluid communication with the exterior of the housing, and a second sealing position wherein the sump is in fluid communication with the auxiliary sump and the auxiliary sump and the exterior of the housing are obstructed from fluid communication.

Preferably, the valve member is movable between the first and second sealing positions by means of a predetermined pressure differential between the signal port and the exterior of the housing. The pressure at the signal port may be applied to the valve member through the sump.

The valve member may be slidable in the housing. The valve member may be slidable captively between the first and second sealing positions. The discharge means may further comprise resilient means for urging the valve member into the first sealing position. The resilient means may comprise a helical spring. The discharge means may further be arranged so that a predetermined pressure differential between the signal port and the exterior of the housing will urge the valve member into the second sealing position.

The discharge means may comprise a casing sealingly engaged in the housing. The valve member may be slidable captively within the casing. The casing may comprise two portions between which the valve member is housed.

The signal port may be adapted to receive pressure signals from a governor valve of the air braking system.

According to a second aspect of the invention there is provided a discharge valve comprising a valve member mounted in a housing, the housing defining a discharge inlet, discharge outlet and an auxiliary sump, the valve member being movable between a first sealing position wherein the discharge inlet and the auxiliary sump are obstructed from fluid communication therebetween and the auxiliary sump is in fluid communication with the discharge outlet, and a second sealing position wherein the discharge inlet is in fluid communication with the auxiliary sump and the auxiliary sump and the discharge outlet are obstructed from fluid communication therebetween.

The valve member may be movable by means of a predetermined pressure differential between the discharge inlet and the discharge outlet. Preferably, the valve member is urged into the first sealing position by means of a resilient member. The resilient member may comprise a helical spring.

A specific embodiment of a drain valve according to the first aspect of the invention and incorporating a discharge valve according to the second aspect of the invention will now be described, by way of example only, with reference to the drawings in which FIG. 1 shows a cross-sectional view in a vertical axial plane of a drain valve according to the invention in a first mode of operation;

Figure 1:
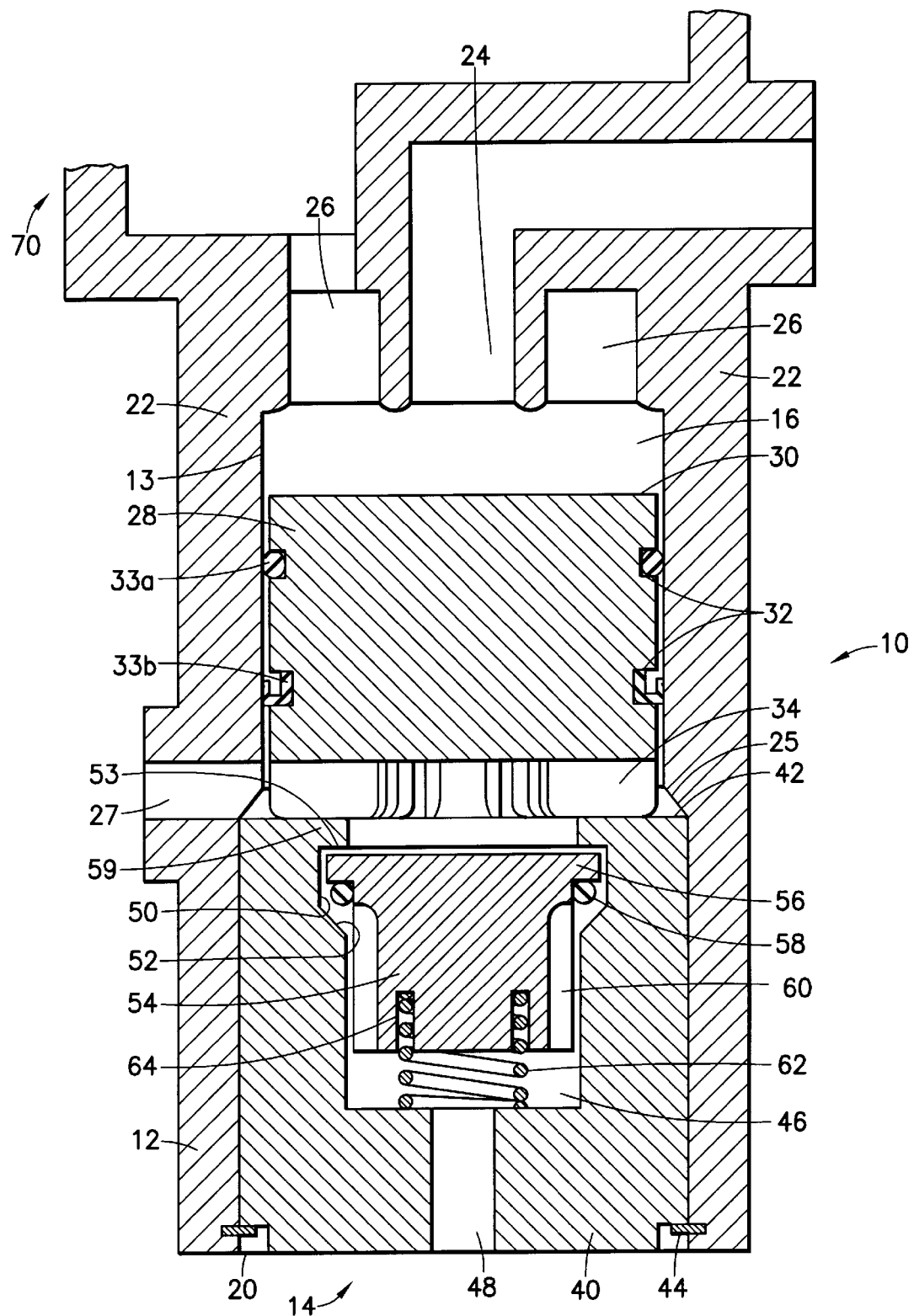

A drain valve 10 comprises a substantially cylindrical housing 12. The housing 12 comprises a first bore 14 extending axially from a lower end 20 through substantially half of the length of the housing 12, and a second bore 16 of smaller diameter than the first bore 14 and coaxially therewith which extends from the end of the first bore 14 to terminate proximate the opposite, upper end 22 of the housing, the sidewall 13 having a shoulder 25 which is chamfered at an oblique angle to the axis of the housing 12.

A flow inlet 24 and a flow outlet 26 are provided at the upper end of the housing 12. The flow inlet 24 is of circular bore, and is co-axial with the bore 14,16, and the flow outlet 26 is concentric with the flow inlet 24. The flow inlet 24 and flow outlet 26 open into the blind end face of the bore 14.

The drain valve 10 is situated beneath a desiccant canister 70, of which only a portion is illustrated in FIGS. 1 to 4 for clarity. The flow outlet 26 is in fluid communication with the interior of the desiccant canister 70.

A signal port 27 extends radially through the sidewall 13 to the bore 14,16 at the shoulder 25.

In the second bore 16 there is provided a cylindrical piston 28. The piston 28 is arranged to slide axially within the second bore. The piston 28 comprises an upper sealing face 30 which can abut against the flow inlet 24 and flow outlet 26 thus sealing them from fluid communication from each other. The piston 28 has two circumferential grooves 32 in which are fitted resilient fluid seals 33a,33b to seal the piston with respect to the sidewall 13, and a castellated lower face 34 directed towards the lower end 20 of the housing 12. The upper seal 33a is an O-ring, the lower seal 33b is a lip seal.

In the first bore 14 there is provided a cylindrical casing 40. The casing 40 is arranged to fit sealingly within the first bore 14, and comprises an upper face 42 which abuts the chamfered shoulder 25 of the housing 12.

The casing 40 is held in abutment with the shoulder 25 by a circlip 44 which is held in a groove at the lower end 20 of the housing 12.

Figure 2:
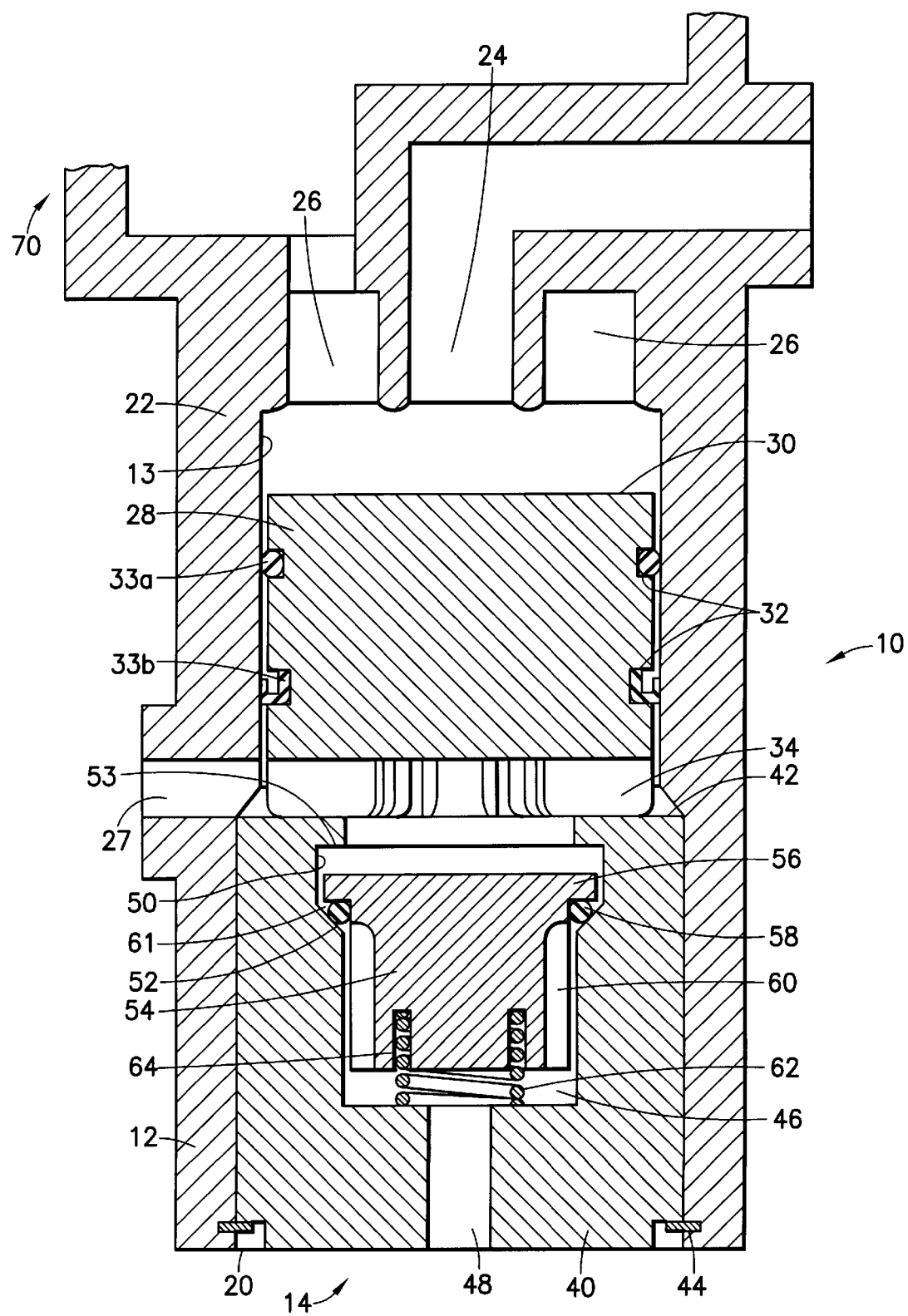
FIG. 2 shows a cross-sectional view similar to FIG. 1 of the drain valve of FIG. 1 in a second mode of operation.
Figure 3:
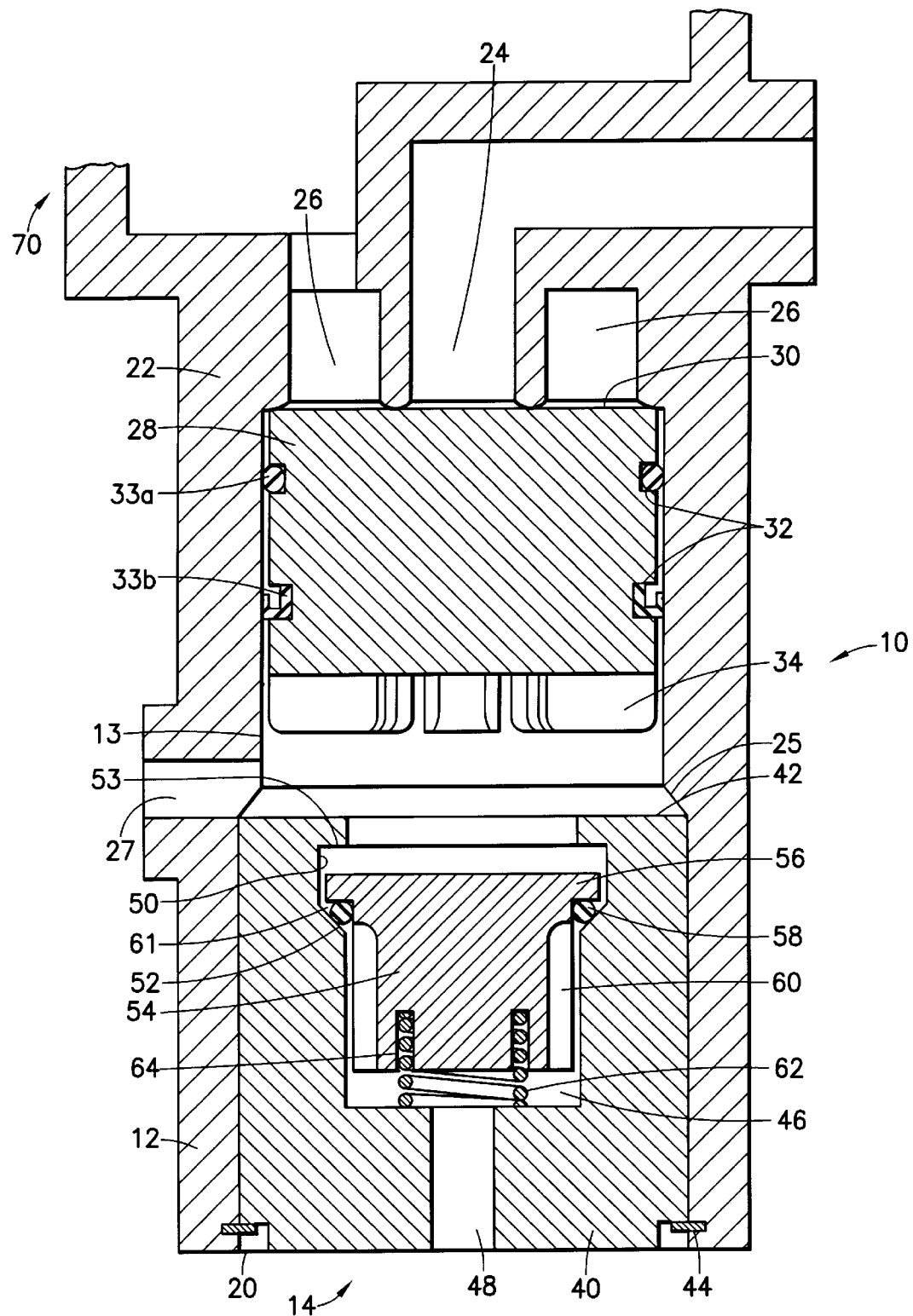
FIG. 3 shows a cross-sectional view similar to FIG. 1 of the drain valve of FIG. 1 in a third mode of operation.
Figure 4:
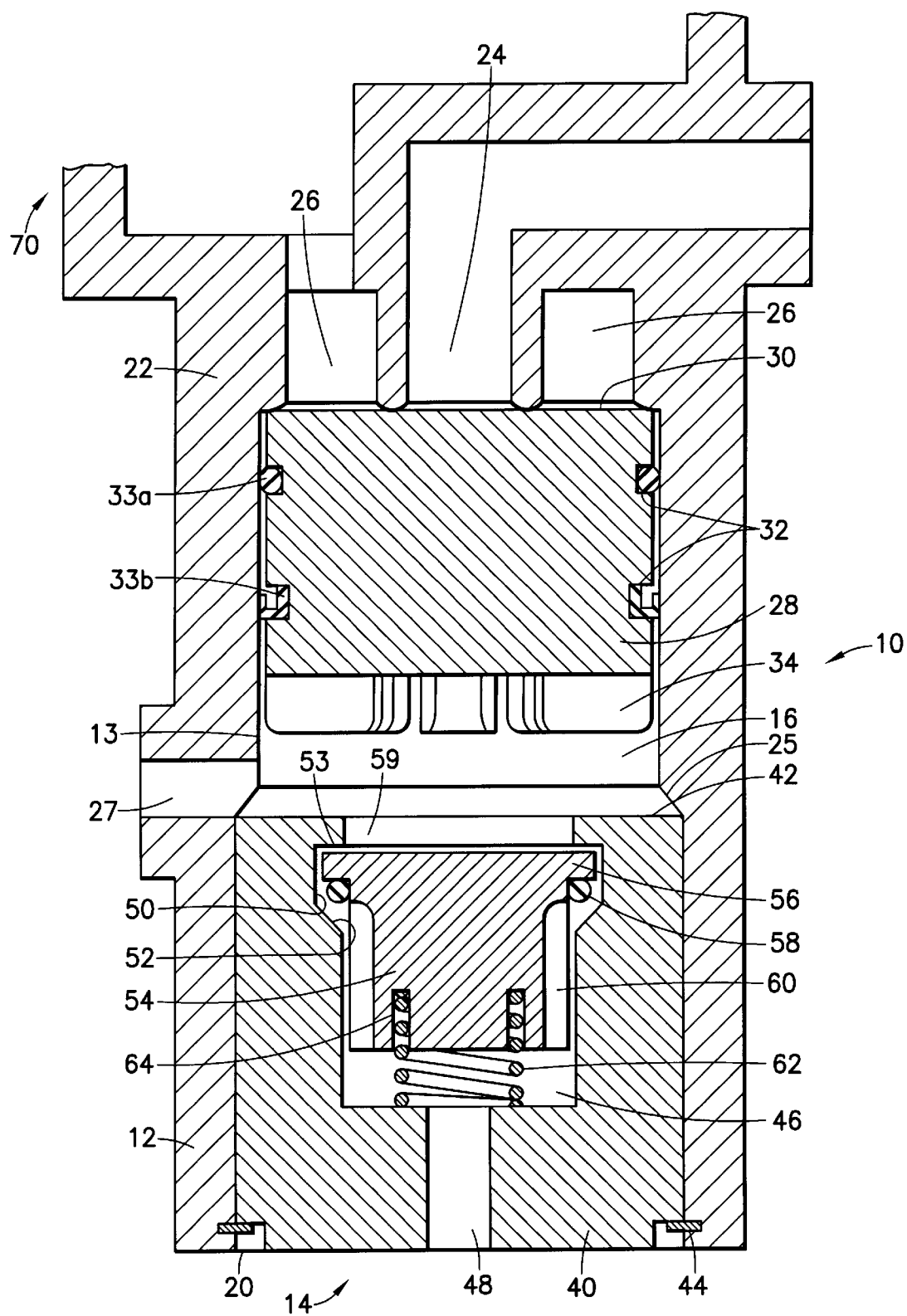
FIG. 4 shows a cross-sectional view similar to FIG. 1 of the drain valve of FIG. 1 in a fourth mode of operation and FIG. 5 shows a cross-sectional view in a vertical axial plane of a compressor for use with the invention.

Accordingly, when the piston 28 is moved downwardly within the housing as shown in FIGS. 2 and 3, it will abut the upper face 42 of the casing 40. The grooves of the castellated face 34 thus defines with the upper face 42 radial channels between the casing 40 and the piston 28, and these channels are in fluid communication with the signal port 27.

The casing 40 comprises a first axial circular drainage bore 46 extending downwardly from the upper face 42 through substantially two-thirds of the length of the casing 40. A second axial circular drainage bore 48 of markedly smaller diameter extends from the base of the first drainage bore 46 to the base of the casing 40, thereby defining a flow path 46,48 through the casing. A circumferential groove 50 is defined in the side wall of the first drainage bore 46, and the lower edge 52 of said groove 50 is chamfered.

A cylindrical drainage piston 54 is enclosed in said first drainage bore 46 of said casing 40. The drainage piston 54 is enclosed in the bore 46 by means of a circumferential rib 56 of the upper end of the piston 54 engaging in the groove 50. The rib 56 is substantially half the width of the groove 50 to allow captive axial movement of the drainage piston 54 in the casing 40. The circumferential rib 56 is sealingly engageable with the upper edge 53 of the groove 50 and an O-ring 58 is provided about the drainage piston 54 below and adjacent the rib 56 to allow alternately for sealing engagement with the chamfered lower edge 52 of the groove 50. A clearance exists between the circumferential wall of the rib 54 and the groove 50.

When the circumferential rib 56 is sealingly engaged with the upper edge 53 of the groove 50, a main sump 59 is defined above the drainage piston 54 and within the first drainage bore 46. Alternatively, when the O-ring 58 is in sealing engagement with the lower edge 52, an auxiliary sump 61 is defined between the circumferential wall of the rib 54, the groove 50 and the O-ring 58.

Axial grooves 60 are provided in the circumferential surface of the drainage piston 54 to provide fluid communication between the groove 50 and the second drainage bore 48. A helical spring 62 is provided between the lower end of the drainage piston 54 and the lower end of the first drainage bore 46, in order to urge the drainage piston upwardly and into engagement with the upper edge of the groove 50. The helical spring 62 is located in a circular slot 64 in the lower end of the drainage piston 54.

It will be appreciated that for practical reasons, the casing 40 is preferably made up of two or more pieces, enabling the casing 40 to be assembled around the drainage piston 54 and thereby holding the piston 54 captively.

Figure 5:
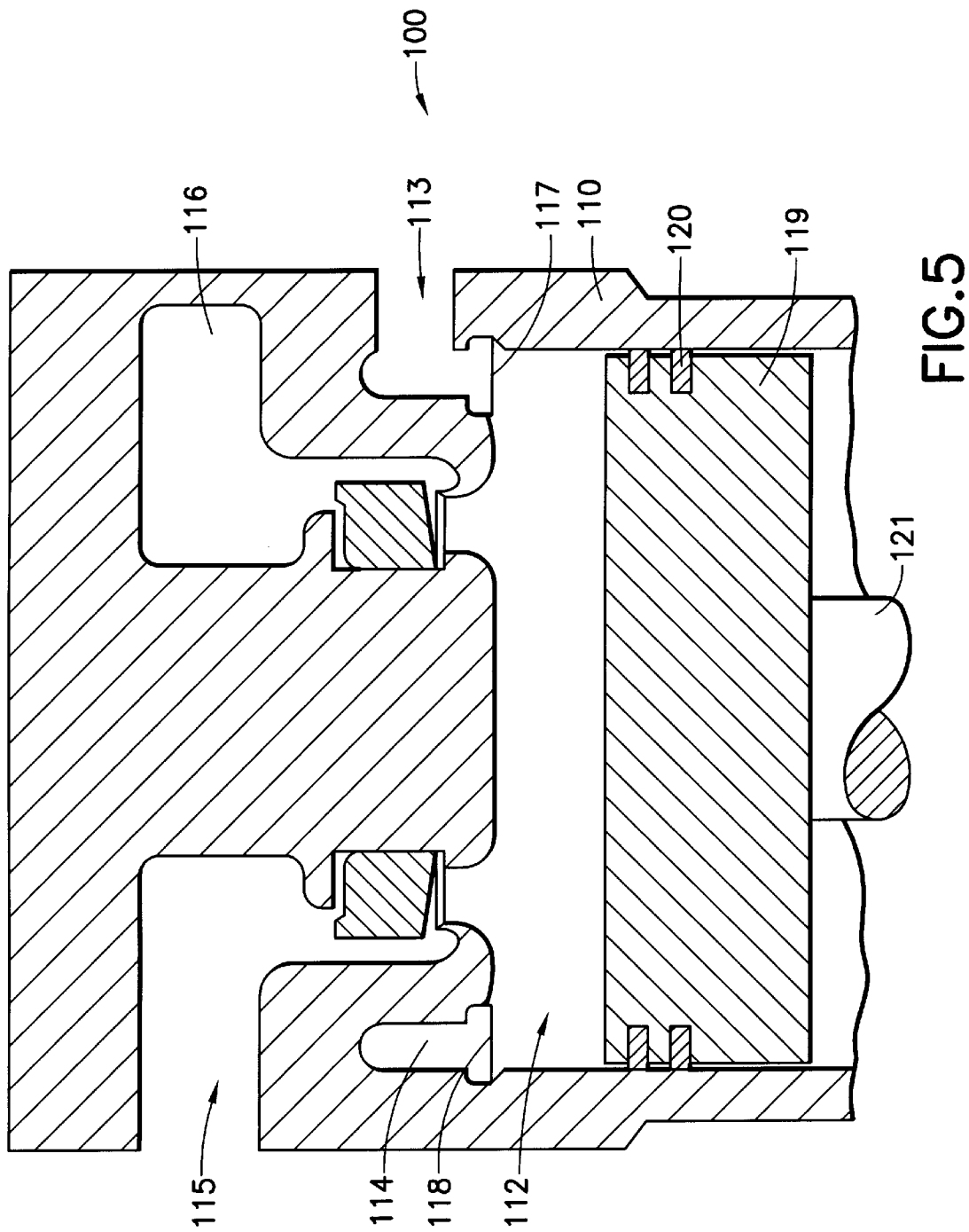

In the preferred embodiment, the drainage valve is used within an air braking system of a motor vehicle. The flow inlet 24 receives air from a compressor and the flow outlet 26 ejects air to an air dryer containing desiccant. A portion of a specific embodiment of a compressor for use with the invention is shown in FIG. 5.

The compressor 100 comprises a cylindrical housing 110 defining a cylinder 112 therein. At one end of the cylinder there is provided a radial inlet 113 in fluid communication with an annular inlet chamber 114 and a radial outlet 115 in fluid communication with an annular outlet chamber 116. The inlet and outlet chambers 114,116 are coaxial with the cylinder 112.

The inlet chamber 114 is in fluid communication with the cylinder 112 via an inlet valve 117. The cylinder 112 is in fluid communication with the outlet chamber 116 via an outlet valve 118. The valves 117,118 are of the diaphragm type, and are mounted such that flow is only possible through the valves 117,118 from the inlet chamber 114 to the cylinder 112 and from the cylinder 112 to the outlet chamber 116 respectively.

The cylinder 112 includes a reciprocating cylindrical piston 119. The piston 119 is adapted to fit tightly within the cylinder and is slidable therein. The piston includes the usual circumferential piston rings 120 to ensure that gases cannot leak past the piston 119. The piston 119 is connected via a con-rod 121 to a drive of a vehicle engine (not shown) to provide reciprocating movement of the piston.

The first mode of operation of the drainage valve 10, which is illustrated in FIG. 1, exists when the piston 28 is in the lowermost position in the housing, such that the castellated surface 34 makes contact with the top of the casing 42, and the drainage piston 54 is in its uppermost position as urged by the spring 62. In that case, flow from the compressor 100 to the desiccant canister 70, via the inlet 24, second bore 16 and outlet 26 is unimpeded. In the first mode of operation, any water which may occur within the drainage valve 10 is allowed to collect in the main sump 59.

On injection of pressure to the valve via signal port 27, forces exerted thereby urge the drainage piston 54 downwardly (FIG. 2) and into the second mode of operation. The O-ring 58 sealingly engages the lower edge 52, thus defining the auxiliary sump 61. Any water which had collected in the main sump 59 now flows through to and collects in the auxiliary sump 61.

On increase of the pressure through the signal port 27, the piston 28 is forced upwardly and into its sealing position (FIG. 3) and the third mode of operation.

In the third mode of operation, the piston 28 seals the flow inlet 24 and flow outlet 26, thereby taking the compressor 100 off load. The pressure in the cylinder 112 of the compressor 100 is high relative to the pressure in the crank case, and so oil leakage around the piston from the crank case is minimised. Therefore oil cannot seep through to the desiccant and cause damage thereto. Any water which occurs within the valve 10 continues to collect in the auxiliary sump 61.

When the compressor 100 is to be brought back on load, the pressure at the signal port 27 is reduced. Firstly, the force exerted on the drainage piston 54 by the pressure at signal port 27 falls below the force exerted by the spring 62. The drainage piston 54 moves upwardly into the uppermost position, the circumferential rib 56 sealing against the upper edge 53 of the groove 50. This is the fourth mode of operation. The main sump 59 is accordingly redefined and collects any water which may occur within the valve 10, and the contents (if any) of the auxiliary sump 61 are discharged via the axial grooves 60 and the drainage outlet 48.

On further reduction of the pressure at the signal port 27, the piston 28 is released from sealing engagement against the flow inlet 24 and flow outlet 26, and the piston 28 falls back to rest on the upper face 42 of the casing 40. This returns the valve 10 to the first mode of operation.

By incorporating a discharge valve as described in the preferred embodiment into a cut-off valve, the cut-off valve may be drained of water without consequent loss of signal pressure.

What is claimed is:

1. A drain valve comprising a housing defining a chamber, a flow inlet and a flow outlet opening into the chamber, a flow path defined in the chamber and providing fluid communication between the flow inlet and the flow outlet, a closure member arranged to move in use within the housing between a first position wherein the flow path is occluded and a second position wherein the flow path is unobstructed, the drain valve further comprising a signal port, and movement of the closure member being effected in use by the presence or absence of a signal pressure at said signal port, and a sump adapted to collect liquid in the drain valve, wherein the sump is in fluid communication with said signal port and comprises discharge means adapted to discharge liquid collected in the sump to the exterior of the valve, the discharge means being activated in use by a predetermined variation in pressure at the signal port.

2. A drain valve according to claim 1 wherein the closure member comprises a piston sealingly slidable in the housing between said first and second positions.

3. A drain valve according to claim 2 wherein the flow inlet and flow outlet comprise concentric openings in one end of the housing, the closure member defining a sealing surface adapted to seal over said openings.

4. A drain valve according to claim 1 wherein said signal port is positioned in a sidewall of the housing.

5. A drain valve according to claim 1 wherein the discharge means comprises a valve member mounted in the housing across a discharge passage in fluid communication between the sump and the exterior of the housing, and an auxiliary sump, the valve member being movable between a first sealing position wherein the sump and the auxiliary sump are obstructed from fluid communication therebetween and the auxiliary sump is in fluid communication with the exterior of the housing, and a second sealing position wherein the sump is in fluid communication with the auxiliary sump and the auxiliary sump and the exterior of the housing are obstructed from fluid communication.

6. A drain valve according to claim 5 wherein the valve member is movable between the first and second sealing positions by means of a predetermined pressure differential between the signal port and the exterior of the housing.

7. A drain valve according to claim 6 wherein the pressure at the signal port is applied to the valve member through the sump.

8. A drain valve according to claim 5 wherein the valve member is slidable in the housing.

9. A drain valve according to claim 5 wherein the discharge means comprises resilient means for urging the valve member into a first sealing position.

10. A drain valve according to claim 5 wherein the discharge means comprises a casing sealingly engaged in the housing, the casing of which the valve member is housed, and the valve member being slidable captively within the casing.

* * * * *